United States Patent [19]
Ishikawa et al.

[11] Patent Number: 5,911,490
[45] Date of Patent: Jun. 15, 1999

[54] OVERHEAD PROJECTOR

[75] Inventors: Takatoshi Ishikawa; Soh Ohzawa, both of Osaka, Japan

[73] Assignee: Minolta Co., Ltd., Osaka, Japan

[21] Appl. No.: 08/921,447

[22] Filed: Aug. 29, 1997

[30] Foreign Application Priority Data

Aug. 30, 1996 [JP] Japan .................................. 8-230285

[51] Int. Cl.$^6$ ............................................... G03B 21/28
[52] U.S. Cl. ........................ 353/99; 353/64; 353/DIG. 3
[58] Field of Search ........................ 353/98, 99, DIG. 3, 353/63, 64, 69, 102, 100

[56] References Cited

U.S. PATENT DOCUMENTS

| | | | |
|---|---|---|---|
| 4,838,686 | 6/1989 | Berglund | 353/DIG. 3 |
| 5,442,415 | 8/1995 | Chao | 353/DIG. 3 |
| 5,622,417 | 4/1997 | Conner et al. | 353/69 |
| 5,716,118 | 2/1998 | Sato et al. | 353/98 |
| 5,730,517 | 3/1998 | Berglund | 353/DIG. 3 |

FOREIGN PATENT DOCUMENTS

| | | |
|---|---|---|
| 4247441 | 9/1992 | Japan . |
| 4366938 | 12/1992 | Japan . |
| 6160977 | 6/1994 | Japan . |

*Primary Examiner*—Wiliam Dowling
*Attorney, Agent, or Firm*—Sidley & Austin

[57] ABSTRACT

An overhead projector provides an unobstructed view of projected images by minimizing the vertical dimension of the projector and provides sufficient brightness of projected images by minimizing the loss of light. The light emitted from a light source housed in the body of the projector is reflected by a first reflection mirror and directed, through a transparent stage on which a transparent original is placed, to a second reflection mirror. Meanwhile, on the transparent stage, the principal ray axis of the light beam forms an angle θ with respect to the center axis of the surface of the transparent original. After reaching the second reflection mirror and being reflected thereby, the light is condensed into a projection lens unit, and is projected therefrom onto a screen to form thereon an image of the transparent original.

16 Claims, 6 Drawing Sheets

OBJ(ymax-left)
(850, 850)
Y=112.49, Z=119.353

OBJ(ymax-center)
(850, 0)
Y=118.087, Z=3.72373e-17

OBJ(ymax-right)
(850, -850)
Y=112.49, Z=-119.353

(0, 850)
Y=-4.92225, Z=119.431

(0, 0)
Y=0.299299, Z=6.34413e-17

(0, -850)
Y=-4.92225, Z=-119.431

(-850, 850)
Y=-121.552, Z=112.613

(-850, 0)
Y=-117.825, Z=3.04074e-17

(-850, -850)
Y=-121.552, Z=-112.613

OVERHEAD PROJECTOR

BACKGROUND OF THE INVENTION

1. Field of the Invention

The present invention relates to an overhead projector for projecting enlarged images onto a screen from a transparent original such as a transparency or a liquid crystal panel.

2. Description of the Prior Art

Overhead projectors (hereinafter also referred to as OHPs) are widely used in conferences and seminars to visually present charts, graphs, and the like to the audience concurrently with oral explanations. An OHP projects enlarged images onto a screen from a transparent original such as a transparency or a liquid crystal panel. To achieve this, an OHP is provided with a projection lens for projecting images onto a screen from a transparent original, and a reflection mirror for reflecting the light from a light source toward the screen. Inconveniently, however, these components are usually arranged above the body of the OHP by the use of support members, and thus they often obstruct part of the view of the images projected onto the screen.

To overcome this inconvenience, various attempts of improvement have been made to OHPs. For example, Japanese Laid-open Patent Application No. H4-366938 discloses a "transmitting OHPT". In this OHP, which allows oblique projection of images, the projection lens and the reflection mirror are arranged to have their optical axes off the center line of the stage for placing an original toward the screen, and a Fresnel lens is arranged to have its optical axis at the intersection between the line from the light source to the projection lens and the surface of the Fresnel lens. As a result, this OHP can project images free from trapezoid distortion onto a screen whose base line is approximately at the same vertical position as the reflection mirror. On the other hand, Japanese Laid-open Patent Application No. H4-247441 Discloses a "reflecting OHP", and this OHP, too, allows oblique projection of images.

Moreover, Japanese Laid-open Patent Application No. H6-160977 discloses another type of OHP that is based on a "reflecting OHP" but does not have any supporting member as mentioned above. This OHP consists of a projector body including a light source, a first reflection mirror for changing the path of light, a projection lens, and a stage for placing a transparent original, and a cover including a transmitting Fresnel lens that is pressed directly onto the original stage, and a second reflection mirror. In this OHP, the light from the light source is reflected by the first reflection mirror onto the image on the transparent original, and the light therefrom is condensed by the second reflection mirror and the Fresnel lens that are mounted on the cover, is then reflected by the first reflection mirror into the projection lens, and is then projected therefrom to form an enlarged image of the original.

However, the OHPs disclosed in Japanese Laid-open Patent Applications Nos. H4-366938 and H4-247441 still have their projection lens and reflection mirror arranged above the projector body by the use of support members. Accordingly, these OHPs provide an unobstructed view of the projected images only within limited ranges of viewing angles, and need to be used in a room where it is possible to secure sufficiently wide space and a sufficiently high ceiling. On the other hand, the OHP disclosed in Japanese Laid-open Patent Application No. H6-160977 is not user-friendly, because its top cover needs to be opened and closed every time the transparent originals are exchanged.

Moreover, most of conventional OHPs employ, as a condenser lens for condensing the light from the image on the transparent original, a transmitting Fresnel lens that has fine concentric grooves formed on its surface. Such a Fresnel lens, however, causes a considerable loss of light due to scattering or other of light, and thus its use results in insufficient brightness of the images projected onto the screen. Brightness can be increased by increasing the power of the light source, but this leads to higher cost, because, it is then necessary to take some measures against accordingly increased generation of heat.

SUMMARY OF THE INVENTION

An object of the present invention is to provide an overhead projector that provides an unobstructed view of projected images by minimizing the vertical dimension of the projector and that provides sufficient brightness of projected images by minimizing the loss of light.

To achieve the above object, according to one aspect of the present invention, a projector is provided with a light source for emitting light; a transparent stage on which a transparent original is provided; a projection lens system; a screen; a first reflection mirror for reflecting the light emitted from the light source in such a way that the light illuminates the transparent stage from a direction inclined at a predetermined angle with respect to the transparent stage; and a second reflection mirror for reflecting the light transmitted through the transparent stage in such a way that the light enters the projection lens system.

According to another aspect of the present invention, a projecting optical system for use in a projector is provided with a projection lens system; a first reflection mirror for reflecting light in such a way that the light illuminates an object plane from a direction inclined at a predetermined angle with respect to the object plane; and a second reflection mirror for reflecting light transmitted through the object plane in such a way that the light enters the projection lens system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
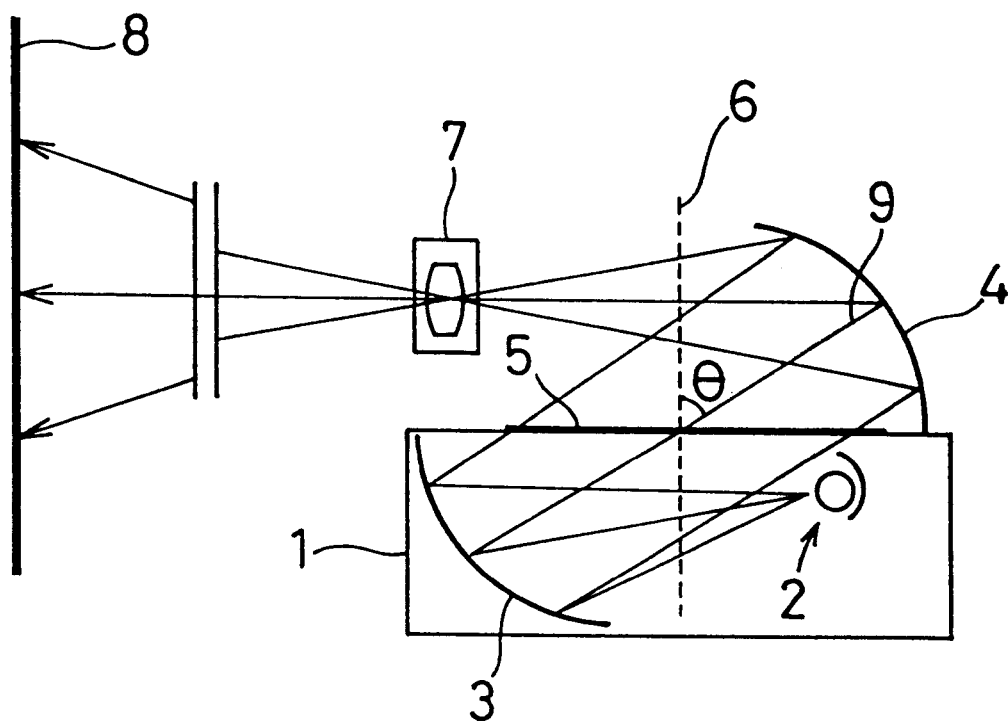
FIG. 1 is a diagram schematically showing the construction of an overhead projector embodying the present invention.

Hereinafter, an embodiment of the present invention will be described with reference to the drawings. FIG. 1 schematically shows the construction of an overhead projector according to the present invention. As shown in FIG. 1, the overhead projector has a body 1 that houses a light source 2 for illuminating an image of a transparent original, and a first reflection mirror 3 for reflecting and condensing the light from the light source 2 to illuminate the transparent original. Further, on the top surface of the body 1 of the overhead projector is fitted a transparent stage 5 for placing the transparent original, and above the body 1 of the overhead projector are arranged a second reflection mirror 4 for reflecting and condensing the light from the image on the transparent original, and a projection lens unit 7 for projecting the image onto a screen 8. Here, the transparent original refers to a transparency, a transmitting liquid crystal panel, or the like.

As shown in FIG. 1, the light emitted from the light source 2 is reflected by the first reflection mirror 3 and directed, through the transparent stage 5 on which a transparent original is placed, to the second reflection mirror 4. Meanwhile, on the transparent stage 5, the principal ray axis 9 of the light beam, i.e. its center line, forms an angle θ with respect to the center axis 6 of the surface of the transparent original. After reaching the second reflection mirror 4 and being reflected thereby, the light is condensed into the projection lens unit 7, and is projected therefrom onto the screen to form thereon an image of the transparent original. Note that the path of the light between the projection lens unit 7 and the screen 8 is omitted in the figure.

In an overhead projector, whether it employs a Fresnel lens or not, the light used for illumination is generally focused (condensed) onto the bottom surface of the transparent stage 5, as in the embodiment under discussion. Note however that, since the use of a Fresnel lens leads to a loss of light due to scattering of light, the overhead projector of the present invention does not employ a Fresnel lens, and thus prevents the illumination light from being scattered and wasted.

Figure 6:
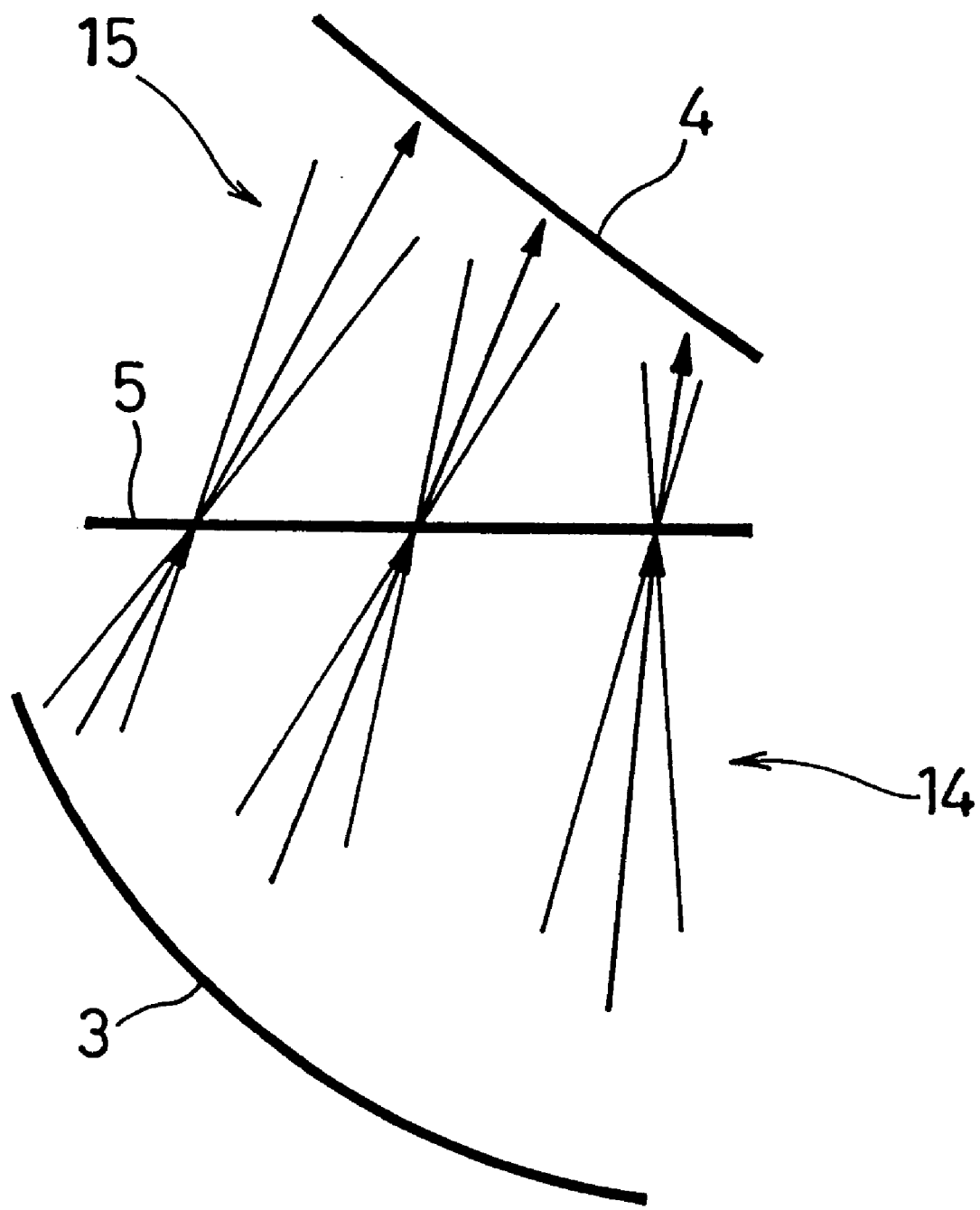
FIG. 6 is a diagram showing how the transparent original is illuminated in the overhead projector.

Moreover, in an overhead projector, the surface of the transparent stage 5 on which the transparent original is placed and the screen 8 are arranged in such a way that the light leaving the former is focused on the latter. In addition, in the overhead projector of the present invention, as shown in FIG. 6, the direction of the principal ray of the light beam 15 that leaves from each point on the surface of the original stage so as to be projected and focused onto the screen 8 is made approximately parallel to the direction (indicated by arrows) from which each point is illuminated by the illumination light 14. This also contributes to efficient use of the illumination light.

Figure 2:
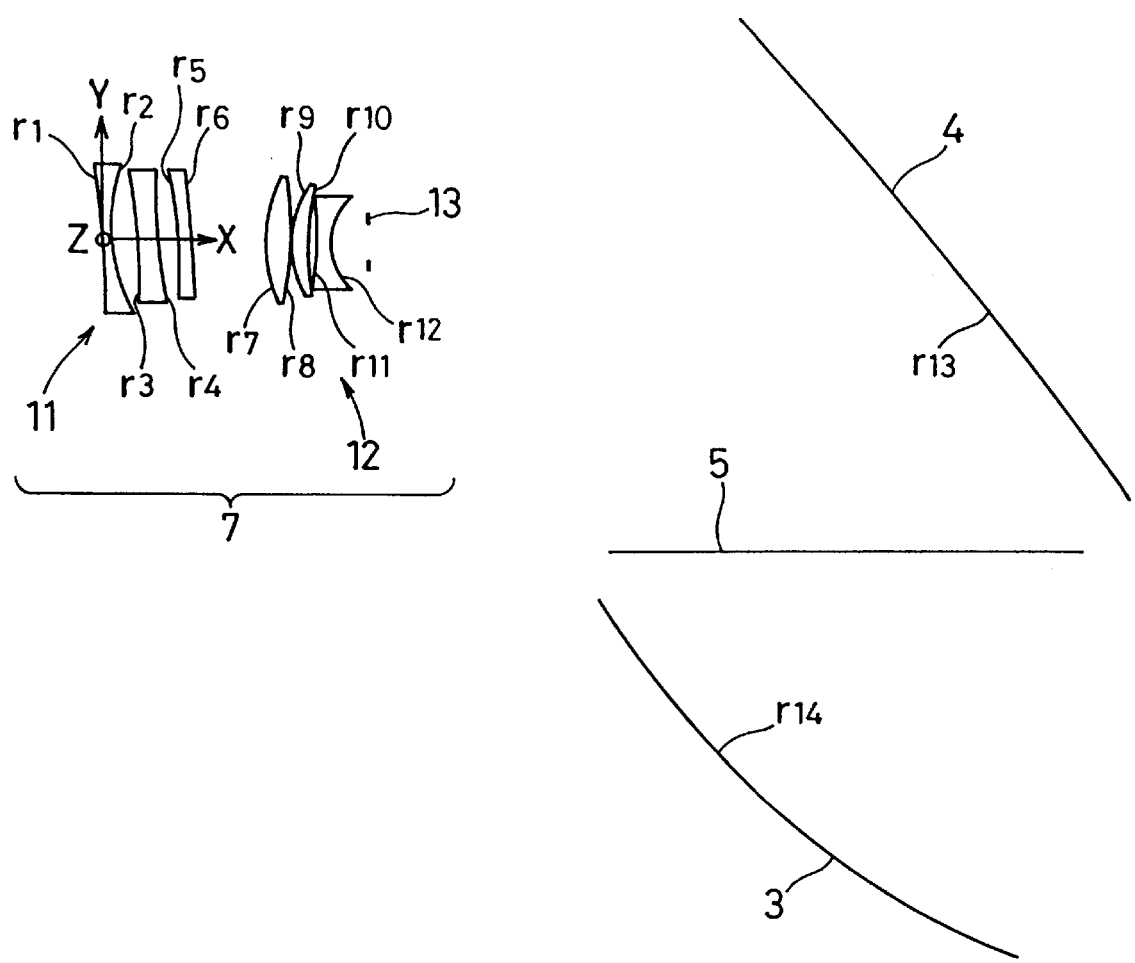
FIG. 2 is a diagram showing the details of the optical system of the overhead projector.

FIG. 2 shows the details of the optical system of the overhead projector of the embodiment. As shown in FIG. 2, the projection lens unit 7 consists of a negative lens unit 11, a positive lens unit 12, and an aperture diaphragm 13. In FIG. 2, the symbol r followed with a number indicates an optical surface of a lens element or of a reflection mirror. The relative positions of the elements constituting the optical system are represented by their coordinates in the three-dimensional coordinate system shown in FIG. 2, of which the X and Y axes are parallel to the sheet of the drawing and perpendicular to each other, and of which the Z axis is perpendicular to the sheet of the drawing and positive toward the reader. The construction data of this optical system is listed in Table 1.

Specifically, Table 1 lists the coordinates of the vertex of the first surface (the leftmost surface in FIG. 2) of the negative and positive lens units 11 and 12, the coordinates of the vertex of the first and second reflection mirrors 3 and 4, the coordinates of the centers of the screen surface and the transparent original surface, the angle of rotation through which each element is rotated so as to be decentered (described later), the curvature of radius of each lens or mirror surface, and the axial distances and the refractive indices between surfaces (a refractive index of −1 indicates a reflecting surface). Note that a positive radius of curvature indicates a surface convex toward the screen, and a negative radius of curvature indicates a surface concave toward the screen.

Figure 3:
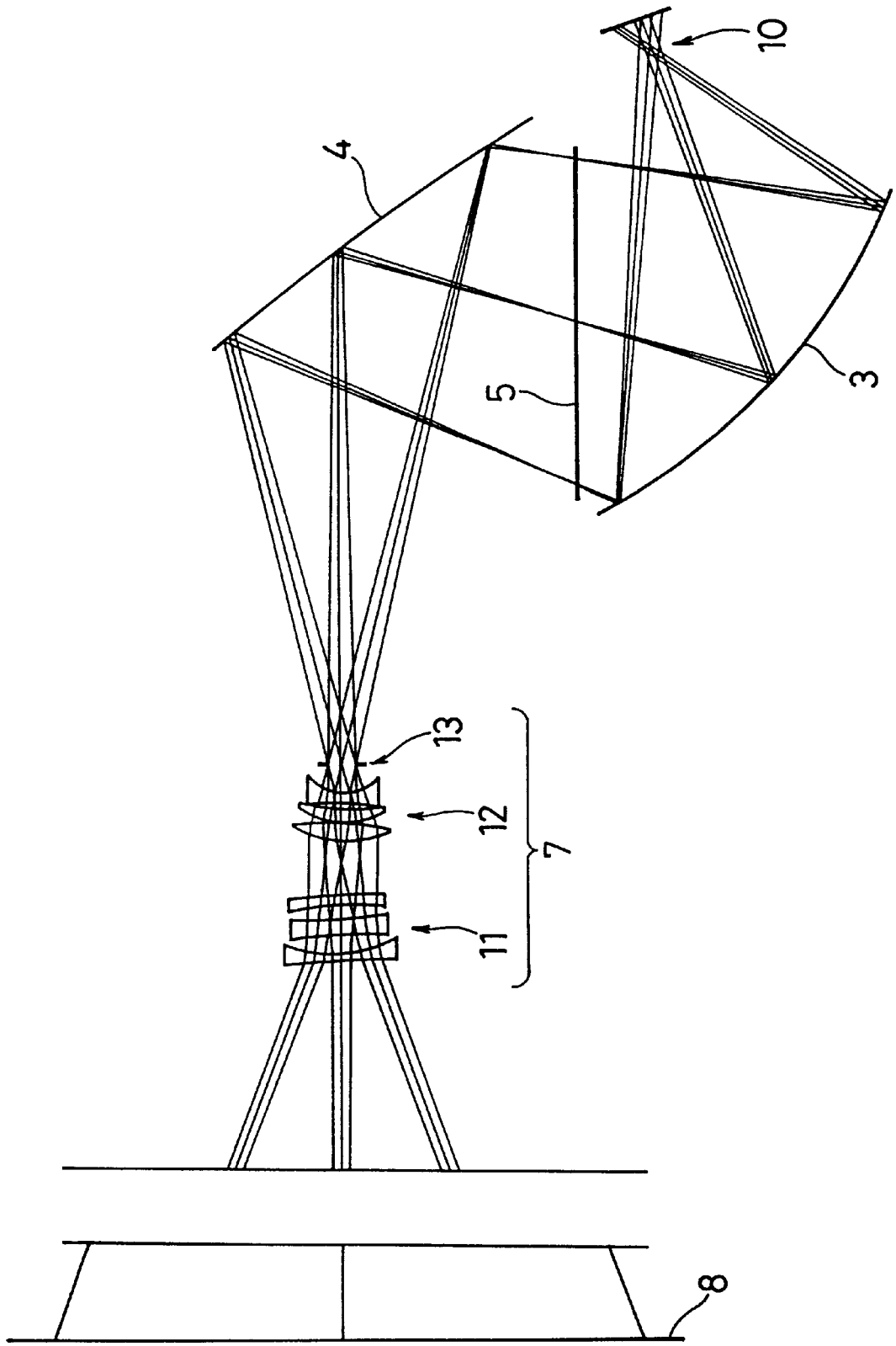
FIG. 3 is an optical path diagram of the optical system of the overhead projector.
Figure 4A:
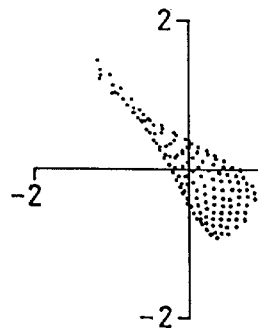
FIGS. 4A to 4I are spot diagrams of the overhead projector.
Figure 4B:
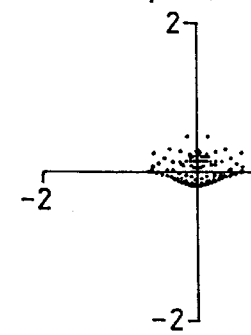
Figure 4C:
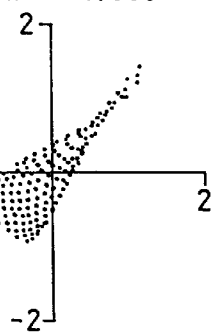
Figure 4D:
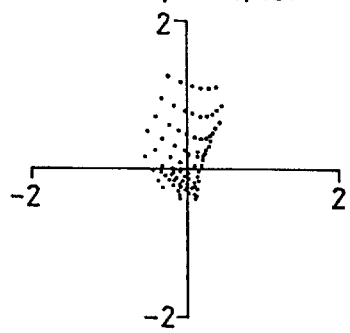
Figure 4E:
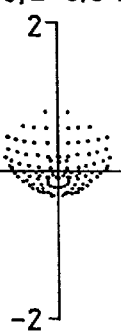
Figure 4F:
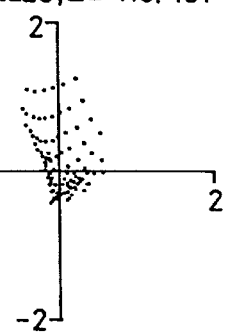
Figure 4G:
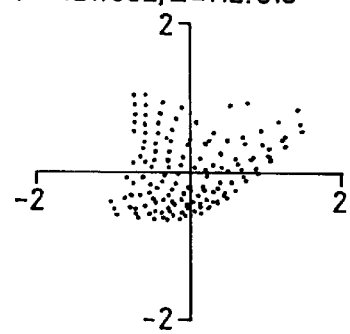
Figure 4H:
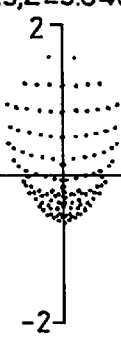
Figure 4I:
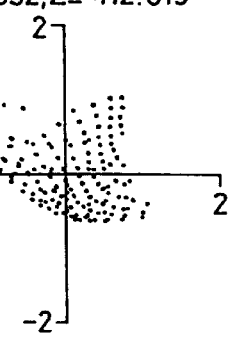

FIG. 3 shows the optical path of the optical system of the overhead projector of the embodiment. As shown in FIG. 3, the light source 2 is placed at a position 10 that allows the light radiated therefrom and then reflected by the first reflection mirror 3 to be focused on the transparent stage 5. Note that the path of light between the projection lens unit 7 and the screen 8 is partially omitted in the figure. As shown in this figure, the aperture diaphragm 13 is placed in the vicinity of the light-source-side focus of the positive lens unit 12, or at a position slightly displaced therefrom toward the positive lens unit 12, and the positive and negative lens units 12 and 11 are arranged in such a way that the principal rays between them travel substantially parallel to one another. As a result, it is possible to reduce the number of lens elements of the positive lens unit 12 for correcting the aberrations that occur in the negative lens unit 11.

Moreover, to correct the distortion that appears in the images projected onto the screen 8, the positive lens unit 12 is decentered rotationally about a point in the vicinity of the aperture diaphragm 13 within the X-Y plane of the above-noted coordinate system, and the negative lens unit 11 is decentered rotationally about the origin of the coordinate system in the X-Y plane. At this time, since the optical elements are so arranged that the light rays exiting from one point on the transparent stage 5 travel parallel when they enter the aperture diaphragm 13, the intermediate image plane as seen from the aperture diaphragm 13 is positioned substantially at an infinite distance. As a result, it is possible to rotate each of the lens units about a point in the vicinity of the aperture diaphragm 13 without breaking the symmetry of the intermediate image plane, and thus it is possible to minimize the distortion resulting from rotational decentering.

As described above, both the positive and negative lens units are decentered rotationally. In addition, the second reflection mirror 4 is also decentered rotationally about a point in the vicinity of the aperture diaphragm 13 in the X-Y plane. This is to correct distortion such as curvature of field that occurs as a result of the light to be focused being passed obliquely through the transparent stage. The rotation angles through which these elements are actually decentered are as listed in Table 1. A positive angle indicates an anticlockwise rotation about the Z axis as viewed from the origin toward the positive direction of the Z axis. Note also that decentering of these elements even allows the base line of the image projection area of the screen 8 to be positioned at a position higher than the projection lens unit 7 and the second reflection mirror 4 without unduly increasing distortion.

Moreover, by forming the surface of the second reflection mirror 4 into a shape that does not have an axis of rotational symmetry, even the part of distortion that cannot be eliminated by the projection lens unit 7 alone can be corrected. The shape of this curved surface is defined by formula (1) below:

$$x = \frac{(y^2 + z^2)/CR}{1 + \{1 - \epsilon 0(y^2 + z^2)/CR^2\}^{1/2}} + G02z^2 + \quad (1)$$

$$G04z^4 + G12yz^2 + G20y^2 + G22y^2z^2 + G30y^3 + G40y^4$$

where CR represents the radius of curvature, $\epsilon 0$ represents the quadric surface coefficient, and G represents the surface coefficient. The specific values of these variables in the embodiment are as listed in Table 1.

Since formula (1) includes only even-number-degree terms with respect to z, it is not affected by the sign of the z coordinate. Accordingly, a curved surface defined by formula (1) has a symmetrical shape with respect to the X-Y plane. This formula (1) is derived by rearranging Zernike's polynomial expansion up to the fourth degree in such a way that x is expressed in terms of y and z.

In an overhead projector according to the present invention, it is desirable that the negative and positive lens units 11 and 12 satisfy the following condition in terms of their power:

$$1.0 < \left|\frac{\phi N}{\phi P}\right| < 1.5$$

where $\phi N$ represents the power of the negative lens unit and $\phi P$ represents the power of the positive lens unit.

If the absolute value of the ratio of the power is smaller than defined above, the projection lens unit 7 has so small an enlargement factor that it is not possible to realize a projector with satisfactory performance. If the absolute value of the ratio of the power is greater than defined above, the three lens elements constituting the negative lens unit 11 cause so large aberrations that it is difficult to correct the aberrations without increasing the number of lens elements in the positive lens unit 12.

Specifically, in the embodiment, $\phi N = 0.0136977$ (1/mm)

$\phi P = 0.01056461$ (1/mm)

$|\phi N/\phi P| = 1.2988$

Moreover, the surface of the first reflection mirror 3 has the shape of an ellipsoid of revolution. As a result, the first reflection mirror 3, when it reflects the light emitted from the light source 2 through the transparent original onto the second reflection mirror 4, condenses the light to a certain degree. This makes it possible to reduce the size of the second reflection mirror 4 and thus its cost, as well as to minimize the obstruction of the field of view.

Moreover, it is desirable that the angle $\theta$ that is formed on the transparent stage 5 between the principal ray axis 9 and the center axis 6 of the surface of the transparent original shown in FIG. 1 be within the range from 10° to 60°. If this angle $\theta$ is smaller than 10°, it is not possible to reduce the vertical dimension of the projector substantially. If the angle $\theta$ is larger than 60°, the anamorphic ratio resulting from the difference of the enlargement factors in the Y-axis and Z-axis directions is so large and the trapezoid and other distortion is so large that their correction requires additional lens elements. Specifically, in the embodiment, the angle $\theta$ is 16.54°, and the reduction factor of the projection lens unit 7 as seen from the screen 8 is 0.1438 in the Y-axis direction and 0.1418 in the Z-axis direction. Accordingly, the size of the transparent original is equal to the size of the screen 8 (1,700×1,700 mm) multiplied by the reduction ratios for the respective directions.

Figure 5:
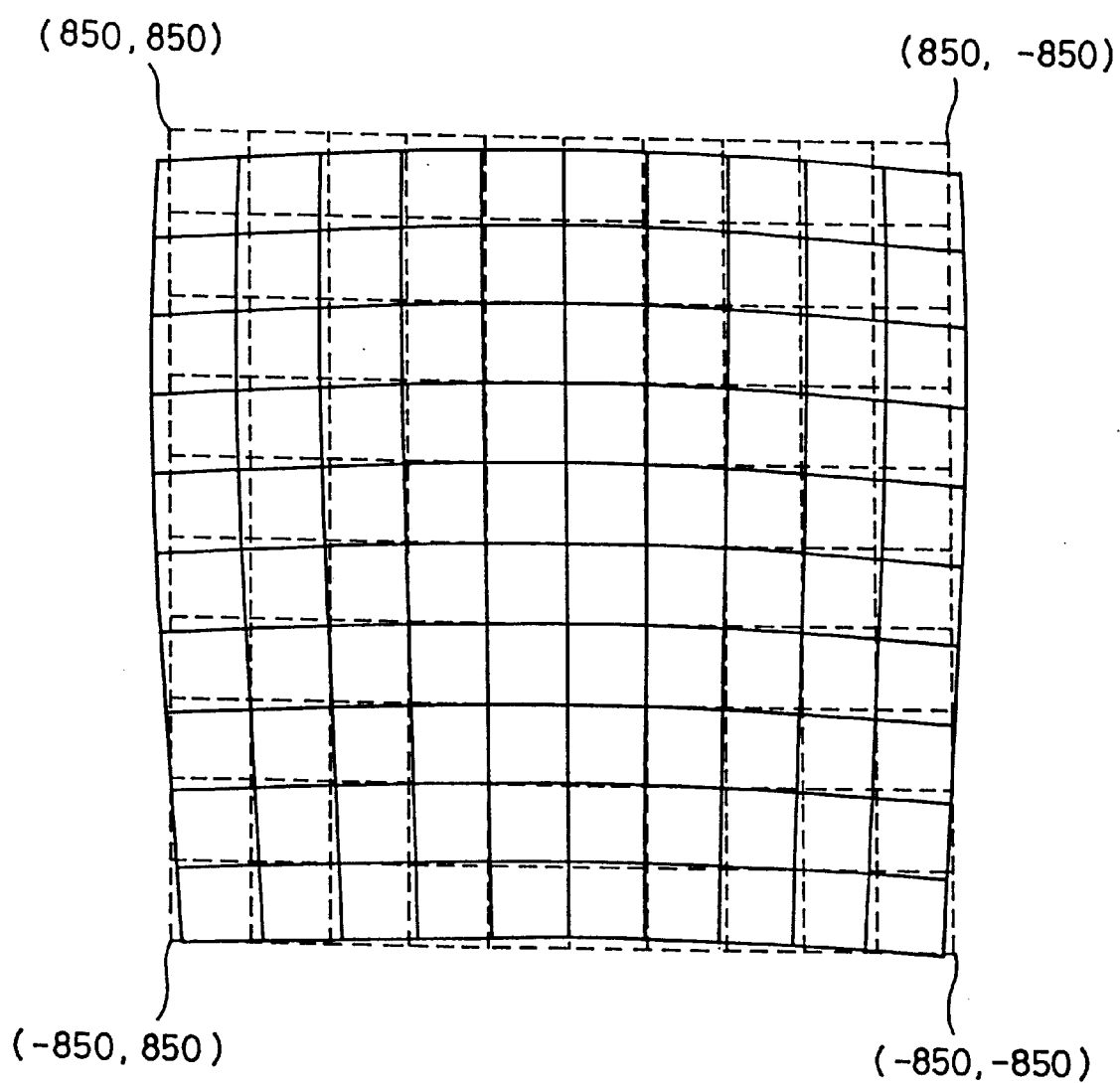
FIG. 5 is a distortion diagram of the overhead projector.

FIGS. 4A to 4I are spot diagrams of the overhead projector of the embodiment. In each diagram, the coordinate values in brackets (y, z) indicate the position at which the center of the diagram would be located if an image was projected onto the screen 8 in an ideal way. In reality, however, as shown in FIG. 5, an image is projected with distortion as indicated by the solid lines as opposed to its ideal image as indicated by the broken lines. Nevertheless, as seen from these figures, the projector of the embodiment provides projected images that are sufficiently close to their ideal images and thus are acceptable in practical uses.

Thus, according to the present invention, it is possible to realize an overhead projector that provides an unobstructed view of projected images by minimizing the vertical dimension of the projector and that provides sufficient brightness of projected images by minimizing the loss of light.

TABLE 1

| <Object Plane> (The Surface of the Screen) | |
|---|---|
| Center of the Screen: | XO = −2300.000 |
| | YO = 0.000000 |
| | ZO = 0.000000 |
| Angle of Rotation: | θO = 0.000000 |
| Projection Size: | Ymax = 850.0000, Ymin = −850.0000 |
| | Zmax = 850.0000, Zmin = −850.0000 |
| <Image Plane> (The Surface of the Transparent Original) | |
| Center of the Transparent Original: | XI = 320.0000 |
| | YI = −170.0000 |
| | ZI = 0.000000 |
| Angle of Rotation: | θI = 90.00000 |
| <Gr1> (Negative Lens Unit) | |
| Vertex of the First Surface: | X1 = 0.000000 |
| | Y1 = 0.000000 |
| | Z1 = 0.000000 |
| Angle of Rotation: | θ1 = −3.547092 |

| Surface | Radius of Curvature | Axial Distance | Refractive Index |
|---|---|---|---|
| r1 | −759.9881 | | |
| | | 5.115000 | 1.765000 |
| r2 | 95.09138 | | |
| | | 13.68300 | 1.000000 |
| r3 | −353.8934 | | |
| | | 11.22100 | 1.511000 |
| r4 | 437.3554 | | |
| | | 10.59200 | 1.000000 |
| r5 | −252.0079 | | |
| | | 7.440000 | 1.765000 |
| r6 | −435.1345 | | |
| | | 0.000000 | 1.000000 |

| <Gr2> (Positive Lens Unit) | |
|---|---|
| Vertex of the First Surface: | X2 = 87.76840 |
| | Y2 = 0.000000 |
| | Z2 = 0.000000 |
| Angle of Rotation: | θ2 = 2.566672 |

| Surface | Radius of Curvature | Axial Distance | Refractive Index |
|---|---|---|---|
| r7 | 81.61533 | | |
| | | 12.70200 | 1.765000 |
| r8 | −202.6441 | | |
| | | 0.5440000 | 1.000000 |
| r9 | 56.46049 | | |
| | | 9.073000 | 1.765000 |

TABLE 1-continued

| Surface | Radius of Curvature | Axial Distance | Refractive Index |
|---|---|---|---|
| r10 | 144.1984 | | |
| | | 4.536000 | 1.000000 |
| r11 | −219.9741 | | |
| | | 7.349000 | 1.511000 |
| r12 | 34.06644 | | |
| | | 20.00000 | 1.000000 |
| Aperture Diaphragm (13) | | | |
| | ∞ (Aperture Radius = 10.00000) | | |
| | | 0.000000 | 1.000000 |

<Gr3> (Second Reflection Mirror)

Vertex: X3 = 323.1153
Y3 = 209.2601
Z3 = 0.000000
Angle of Rotation: θ3 = −47.71455

| Surface | Radius of Curvature | Axial Distance | Refractive Index |
|---|---|---|---|
| r13 | −2047.281 | | |
| | | 0.000000 | −1.000000 |

Surface Coefficient:

| | G02 | G04 |
|---|---|---|
| 0 | 6.445419E-06 | 8.658085E-09 |
| | G12 | |
| 1 | 2.090296E-06 | |
| | G20 | G22 |
| 2 | 5.708070E-06 | 4.778167E-09 |
| | G30 | |
| 3 | 5.545023E-07 | |
| | G40 | |
| 4 | 8.571392E-10 | |

Quadric Surface Coefficient:
ε0 = 0.7096090

<Gr4> (First Reflection Mirror)

Vertex: X4 = 574.9400
Y4 = −399.9982
Z4 = 0.000000
Angle of Rotation: θ4 = −73.18971

| Surface | Radius of Curvature | Axial Distance | Refractive Index |
|---|---|---|---|
| r14 | −351.7009 | | |
| | | 0.000000 | −1.000000 |

Quadric Surface Coefficient:
ε0 = 0.2315472

What is claimed is:

1. A projector comprising:
   a light source for emitting light;
   a transparent stage on which a transparent original is provided;
   a projection lens system;
   a screen;
   a first reflection mirror for reflecting the light emitted from the light source in such a way that the light illuminates the transparent stage from a direction inclined at a predetermined angle with respect to the transparent stage; and
   a second reflection mirror for reflecting the light transmitted through the transparent stage in such a way that the light enters the projection lens system, said second reflection mirror having a curved shape.

2. A projector as claimed in claim 1, wherein the first reflection mirror has positive power and focuses the reflected light approximately on the transparent stage.

3. A projector comprising:
   a light source for emitting light;
   a transparent stage on which a transparent original is provided;
   a projection lens system;
   a screen;
   a first reflection mirror for reflecting the light emitted from the light source in such a way that the light illuminates the transparent stage from a direction inclined at a predetermined angle with respect to the transparent stage; and
   a second reflection mirror for reflecting the light transmitted through the transparent stage in such a way that the light enters the projection lens system,
   wherein the first reflection mirror has positive power and makes principal rays of the reflected light approximately parallel.

4. A projector comprising:
   a light source for emitting light;
   a transparent stage on which a transparent original is provided;
   a projection lens system;
   a screen;
   a first reflection mirror for reflecting the light emitted from the light source in such a way that the light illuminates the transparent stage from a direction inclined at a predetermined angle with respect to the transparent stage; and
   a second reflection mirror for reflecting the light transmitted through the transparent stage in such a way that the light enters the projection lens system,
   wherein an optical axis of the projection lens system and an optical axis of the second reflection mirror are optically not parallel with each other.

5. A projector comprising:
   a light source for emitting light;
   a transparent stage on which a transparent original is provided;
   a projection lens system;
   a screen;
   a first reflection mirror for reflecting the light emitted from the light source in such a way that the light illuminates the transparent stage from a direction inclined at a predetermined angle with respect to the transparent stage; and
   a second reflection mirror for reflecting the light transmitted through the transparent stage in such a way that the light enters the projection lens system,
   wherein the second reflection mirror has a curved shape that does not have an axis of rotational symmetry.

6. A projector comprising:
   a light source for emitting light;
   a transparent stage on which a transparent original is provided;
   a projection lens system;
   a screen;
   a first reflection mirror for reflecting the light emitted from the light source in such a way that the light illuminates the transparent stage from a direction inclined at a predetermined angle with respect to the transparent stage; and
   a second reflection mirror for reflecting the light transmitted through the transparent stage in such a way that the light enters the projection lens system, wherein the projection lens system consists of a plurality of lens units, of which at least one is arranged to have its optical axis off an optical axis common to the other lens units.

7. A projector as claimed in claim 6, wherein the projection lens system comprises, from a light-source side:

an aperture diaphragm;

a positive lens unit; and a negative lens unit.

8. A projector as claimed in claim 7, wherein the projection lens system satisfies the following condition:

$$1.0 < \left|\frac{\phi N}{\phi P}\right| < 1.5$$

where φ N represents power of the negative lens unit and φP represents power of the positive lens unit.

9. A projecting optical system for use in a projector, comprising:

a projection lens system;

a first reflection mirror for reflecting light in such a way that the light illuminates an object plane from a direction inclined at a predetermined angle with respect to the object plane; and a second reflection mirror for reflecting light transmitted through the object plane in such a way that the light enters the projection lens system, said second reflection mirror having a curved shape.

10. A projector as claimed in claim 9, wherein the first reflection mirror has positive power and focuses the reflected light approximately on the object plane.

11. A projecting optical system for use in a projector comprising:

a projection lens system;

a first reflection mirror for reflecting light in such a way that the light illuminates an object plane from a direction inclined at a predetermined angle with respect to the object plane; and a second reflection mirror for reflecting light transmitted through the object plane in such a way that the light enters the projection lens system, wherein the first reflection mirror has positive power and makes principal rays of the reflected light approximately parallel.

12. A projecting optical system for use in a projector, comprising:

a projection lens system;

a first reflection mirror for reflecting light in such a way that the light illuminates an object plane from a direction inclined at a predetermined angle with respect to the object plane; and a second reflection mirror for reflecting light transmitted through the object plane in such a way that the light enters the projection lens system, wherein an optical axis of the projection lens system and an optical axis of the second reflection mirror are optically not parallel with each other.

13. A projecting optical system for use in a projector, comprising:

a projection lens system;

a first reflection mirror for reflecting light in such a way that the light illuminates an object plane from a direction inclined at a predetermined angle with respect to the object plane; and a second reflection mirror for reflecting light transmitted through the object plane in such a way that the light enters the projection lens system, wherein the second reflection mirror has a curved shape that does not have an axis of rotational symmetry.

14. A projecting optical system for use in a projector, comprising:

a projection lens system;

a first reflection mirror for reflecting light in such a way that the light illuminates an object plane from a direction inclined at a predetermined angle with respect to the object plane; and a second reflection mirror for reflecting light transmitted through the object plane in such a way that the light enters the projection lens system, wherein the projection lens system consists of a plurality of lens units, of which at least one is arranged to have its optical axis off an optical axis common to the other lens units.

15. A projecting optical system as claimed in claim 14, wherein the projection lens system comprises, from a light-source side:

an aperture diaphragm;

a positive lens unit; and a negative lens unit.

16. A projecting optical system as claimed in claim 15, wherein the projection lens system satisfies the following condition:

$$1.0 < \left|\frac{\phi N}{\phi P}\right| < 1.5$$

where φN represents the power of the negative lens unit and φP represents the power of the positive lens unit.

* * * * *